United States Patent
Kazuno

(10) Patent No.: US 9,623,766 B2
(45) Date of Patent: Apr. 18, 2017

(54) CONTROL METHOD OF FUEL CELL SYSTEM, FUEL CELL AUTOMOBILE, AND FUEL CELL SYSTEM

(71) Applicant: HONDA MOTOR CO., LTD., Tokyo (JP)

(72) Inventor: Shuichi Kazuno, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/963,240

(22) Filed: Dec. 9, 2015

(65) Prior Publication Data

US 2016/0167545 A1    Jun. 16, 2016

(30) Foreign Application Priority Data

Dec. 11, 2014    (JP) ................. 2014-250914

(51) Int. Cl.
| | | |
|---|---|---|
| B60L 11/18 | (2006.01) | |
| H01M 8/04746 | (2016.01) | |
| H01M 16/00 | (2006.01) | |
| H01M 8/04858 | (2016.01) | |

(52) U.S. Cl.
CPC ....... B60L 11/1887 (2013.01); B60L 11/1883 (2013.01); H01M 8/04753 (2013.01); H01M 8/04888 (2013.01); H01M 16/003 (2013.01); H01M 2220/20 (2013.01); H01M 2250/20 (2013.01); Y02B 90/12 (2013.01); Y02T 10/7005 (2013.01); Y02T 10/7241 (2013.01); Y02T 90/32 (2013.01)

(58) Field of Classification Search
CPC ............ B60L 11/1887; B60L 11/1883; H01M 8/04559; H01M 2250/20; H01M 16/006; H01M 16/003; H01M 2220/20; H01M 8/04753

See application file for complete search history.

(56) References Cited

U.S. PATENT DOCUMENTS

2014/0302415 A1* 10/2014 Peterson ........... H01M 8/04037
429/434

FOREIGN PATENT DOCUMENTS

| JP | 2005-348530 | 12/2005 |
|---|---|---|
| JP | 2011-003278 | 1/2011 |
| JP | 2011-211770 | 10/2011 |

OTHER PUBLICATIONS

Japanese Office Action for corresponding JP Application No. 2014-250914, Jan. 24, 2017 (w/ English machine translation).

* cited by examiner

*Primary Examiner* — Yuen Wong
(74) *Attorney, Agent, or Firm* — Mori & Ward, LLP

(57) ABSTRACT

A control method of a fuel cell system includes generating electricity in a fuel cell through reaction of an oxidant gas and a fuel gas so as to output a fuel cell voltage. An electric storage device voltage is outputted from an electric storage device. The electric storage device voltage serves as a primary side voltage. A motor driving voltage serves as a secondary side voltage and is to be applied to a motor driving device to drive a motor. The secondary side voltage is applied to an air pump driving device to drive an air pump so as to supply the oxidant gas to the fuel cell. A required air pump voltage to apply to the air pump driving device is set in accordance with a target generated electric power of the fuel cell. The secondary side voltage is set so as to satisfy the required air pump voltage.

13 Claims, 12 Drawing Sheets

CONTROL METHOD OF FUEL CELL SYSTEM, FUEL CELL AUTOMOBILE, AND FUEL CELL SYSTEM

CROSS-REFERENCE TO RELATED APPLICATIONS

The present application claims priority under 35 U.S.C. §119 to Japanese Patent Application No. 2014-250914, filed Dec. 11, 2014, entitled "Control Method of Fuel Cell System, and Fuel Cell Automobile." The contents of this application are incorporated herein by reference in their entirety.

BACKGROUND

1. Field

The present disclosure relates to a control method of a fuel cell system, a fuel cell automobile, and a fuel cell system.

2. Description of the Related Art

There has previously been disclosed a fuel cell system having a voltage transducer that converts electric storage device voltage serving as primary side voltage into motor driving voltage serving as secondary side voltage, and applies this motor driving voltage to a motor driving unit, as illustrated in FIG. 1 of Japanese Unexamined Patent Application Publication No. 2005-348530, for example. The fuel cell system disclosed in Japanese Unexamined Patent Application Publication No. 2005-348530 uses technology for also applying the secondary side voltage to an air pump driving unit as air pump driving voltage, and supplying oxidant gas from the air pump to the fuel cell via the air pump driving unit.

SUMMARY

According to a first aspect of the present invention, a control method of a fuel cell system includes generating electricity in a fuel cell through reaction of an oxidant gas and a fuel gas so as to output a fuel cell voltage. An electric storage device voltage is outputted from an electric storage device. The control method includes converting from the electric storage device voltage to a motor driving voltage or from the motor driving voltage to the electric storage device voltage. The electric storage device voltage serves as a primary side voltage. The motor driving voltage serves as a secondary side voltage and is to be applied to a motor driving device to drive a motor. The secondary side voltage is applied to an air pump driving device to drive an air pump so as to supply the oxidant gas to the fuel cell. A required air pump voltage to apply to the air pump driving device is set in accordance with a target generated electric power of the fuel cell. The secondary side voltage is set so as to satisfy the required air pump voltage.

According to a second aspect of the present invention, a fuel cell system includes a fuel cell, an electric storage device, a motor, a voltage transducer, an air pump, and a controller. The fuel cell is to generate electricity through reaction of an oxidant gas and a fuel gas so as to output a fuel cell voltage. The electric storage device is to output an electric storage device voltage. The motor is to be driven through a motor driving device. The voltage transducer is to convert from the electric storage device voltage to a motor driving voltage or from the motor driving voltage to the electric storage device voltage. The electric storage device voltage serves as a primary side voltage. The motor driving voltage serves as a secondary side voltage and is to be applied to the motor driving device. The air pump is to be driven through an air pump driving device so as to supply the oxidant gas to the fuel cell. The secondary side voltage is to be applied to the air pump driving device. The controller is configured to set a required air pump voltage to apply to the air pump driving device in accordance with a target generated electric power of the fuel cell and configured to set the secondary side voltage so as to satisfy the required air pump voltage.

According to a third aspect of the present invention, a fuel cell automobile includes the fuel cell system.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
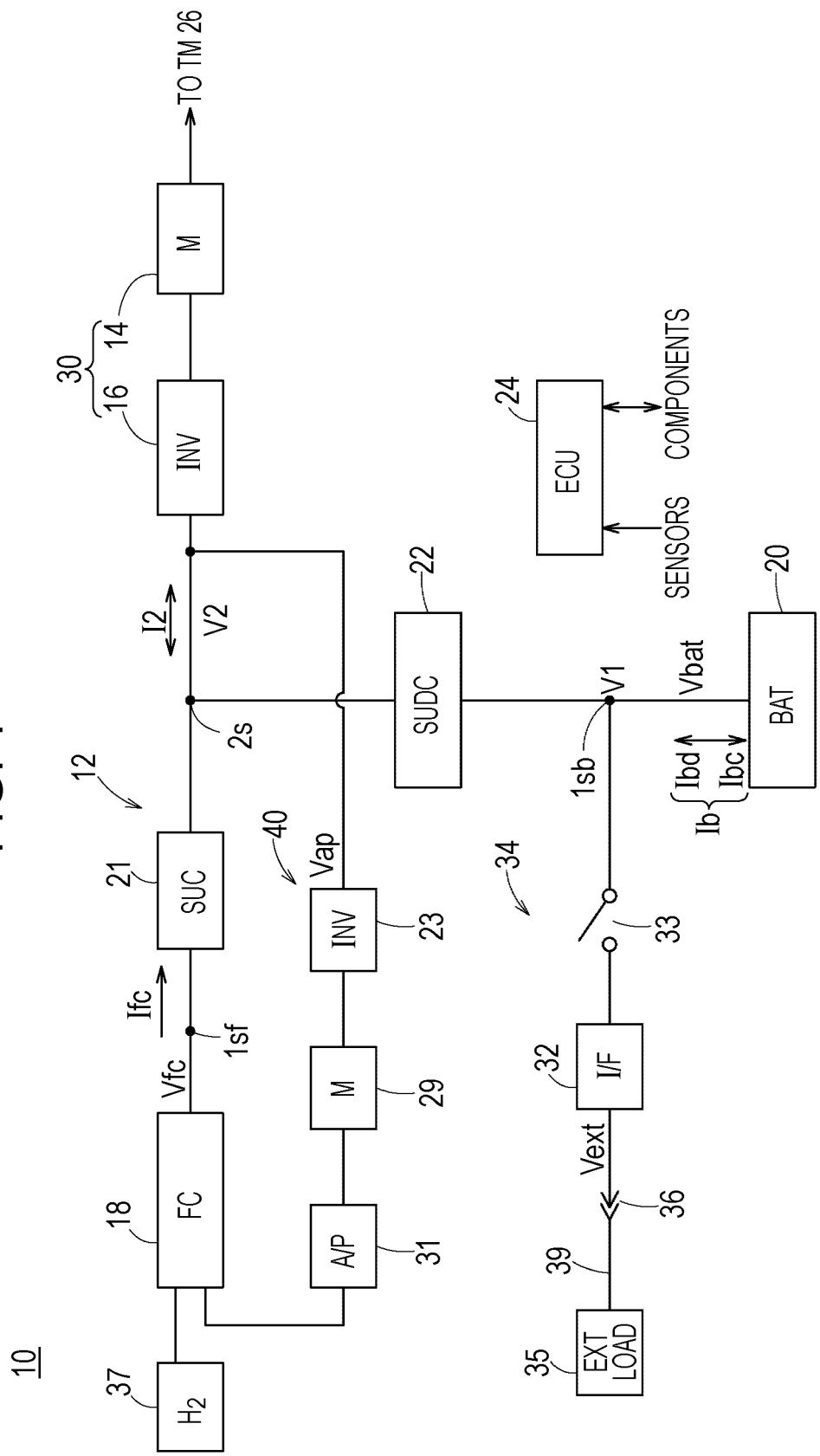
FIG. 1 is an schematic overall configuration diagram of a fuel cell automobile to which a fuel cell system according to an embodiment of the present disclosure has been applied.

The embodiments will now be described with reference to the accompanying drawings, wherein like reference numerals designate corresponding or identical elements throughout the various drawings.

A control method of a fuel cell system according to the present disclosure will be described by way of an embodiment with regard to the relationship between the control method and a fuel cell automobile for carrying out the control method, with reference to the attached drawings. FIG. 1 is an overall schematic configuration diagram of a fuel cell automobile 10 (hereinafter referred to as "FC automobile 10" or simply "vehicle 10") to which a fuel cell system 12 (hereinafter referred to as "FC system 12") according to the present embodiment.

Figure 2:
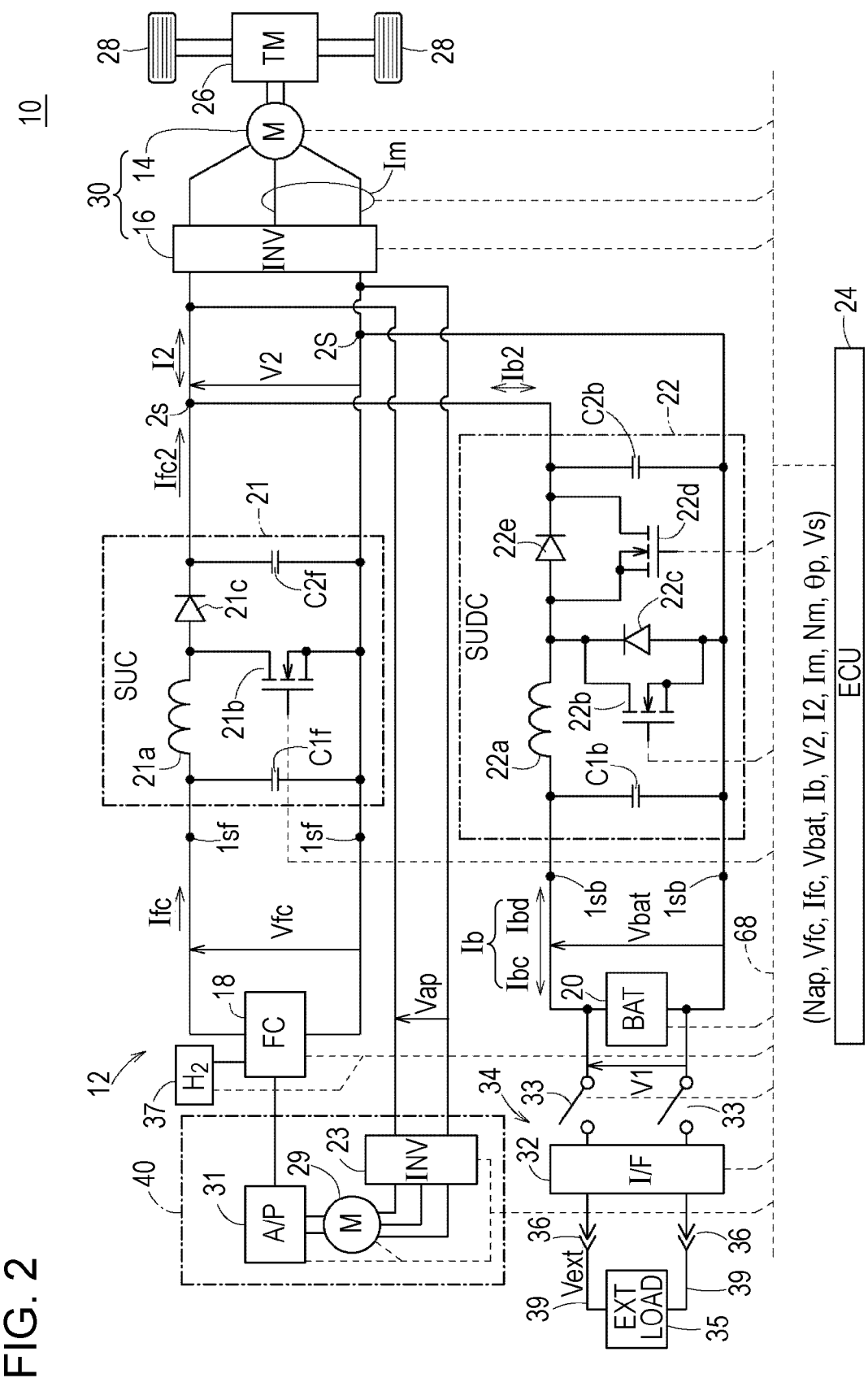
FIG. 2 is a schematic circuit diagram including a detailed configuration of an example of a step up converter and step up/down converter in the fuel cell automobile in the example illustrated in FIG. 1.

FIG. 2 is a schematic circuit diagram of the FC automobile 10, including a detailed configuration of an example of a chopper-type step-up converter (SUC) 21 (hereinafter referred to as "SUC 21") which is a fuel cell side converter disposed between a primary side 1sb and a secondary side 2s, serving as a first transducer (boost converter) and a chopper-type both-way step-up/down converter (SUDC) 22 (hereinafter referred to as "SUDC 22") which is a electric storage device side converter disposed between the primary side 1sb and the secondary side 2s, serving as a second transducer (boost-buck converter).

The FC automobile 10 includes the FC system 12, a driving motor 14 that is a motor generator whereby the vehicle can run, an inverter (INV) 16 (hereinafter referred to as "INV 16") serving as a load driving circuit (motor driving circuit), and an external electric power supply unit 34.

The FC system 12 basically includes a fuel cell device 18 (hereinafter referred to as "FC 18") disposed at one primary side 1sf, a high-voltage battery 20 (hereinafter referred to as "BAT 20") that is an electric storage device disposed at another primary side 1sb, the SUC 21, the SUDC 22, an air pump unit 40 that high voltage (secondary side voltage V2), the external electric power supply unit 34, and an electronic control unit (ECU) 24 (hereinafter referred to as "ECU 24") serving as a control device.

The air pump unit 40 includes an air pump (AP) 31 that pumps air to the FC 18, an air pump motor 29, and an air pump inverter (INV) 23 (hereinafter referred to as "INV 23") serving as an air pump driving unit that drives the air pump 31 via the air pump motor 29.

The external electric power supply unit 34 is configured including an external electric power supply interface 32 serving as an external electric power supply drive unit to which an external electric power supply connector 36 is connected, and an external electric power supply switch 33 which only is in an on state (closed state) when an ignition switch, omitted from illustration, is switched to an external electric power supply position. The ignition switch is switched to either one or the other of a run-enabled position (drive position) and the external electric power supply position. The external electric power supply switch 33 is in an off state (open state) when at a running enabled position or the like.

Upon an external load 35 being connected (mounted) to the external electric power supply connector 36 via an external electric power supply cord (power feed line) 39 when the FC automobile 10 is parked or the like, and the external electric power supply switch 33 being turned to an on state, an external electric power supply state is effected, FC electric power (generated electric power) Pfc of the FC 18 is supplied to the external load 35 via the SUC 21, SUDC 22, external electric power supply switch 33, external electric power supply interface 32, external electric power supply connector 36, and electric power supply cord (power feed line) 39. As a result, the BAT voltage Vbat of the BAT 20 is set to an open circuit voltage (OCV) Vbatocv where there is no charging/discharging.

The external electric power supply interface 32 has a function of converting primary side voltage V1 into external electric power supply voltage Vext which is commercial AC voltage. In a case where the external load 35 is a house or the like, a modification may be made to the configuration so that the external electric power supply interface 32 is configured as a step-down converter (SDC), for example, to supply DC voltage of a constant voltage, with an inverter (DC voltage to commercial AC voltage converter) provided at the side of a house to supply to the external load 35. From the perspective of cost and the like, the external load 35 is normally set low, to around ½ to ¹⁄₁₀₀ of the internal load of the FC automobile 10 including the load 30 such as the driving motor 14 and so forth.

The output end of the FC 18 is connected to the input end (primary side 1sf) of the SUC 21, and the output end (secondary side 2s) of the SUC 21 is connected to the DC end side of the INV 16 and air pump inverter 23 (INV 23) and one end side (high-voltage end side) of the SUDC 22. Connected to the other end side (low-voltage end side) of the SUDC 22 is the input/output ends of the BAT 20. A low-voltage battery such as +12 V or the like, and low-voltage components such as the ECU 24, lights, and so forth, are connected to the input/output ends of the BAT 20 via a buck converter omitted from illustration.

FC generated electric power (FC electric power) Pfc (where Pfc=Vfc×Ifc) supplied from the FC 18 and BAT discharge electric power Pbatd (where Pbatd=Vbat×Ibd) that is stored electric power supplied from the BAT 20 are combined to form a combined electric power (Pfc+Pbatd) when running. Electric power of a value of this combined electric power is supplied to the driving motor 14 via the INV 16, whereby the driving motor 14 generates driving force, and rotates wheels 28 (driving wheels) by this driving force through a transmission 26.

The INV 16 has a three-phase full-bridge configuration for example, and performs DC-to-AC conversion, in which secondary side voltage V2 is converted into three-phase AC voltage and supplied to the driving motor 14 (when power running). This secondary side voltage V2 is obtained by the DC FC voltage Vfc from the FC 18 being boosted at the SUC 21. The INV 16 also performs conversion into three-phase AC voltage, and supplies to the driving motor 14 (when power running), secondary side voltage V2 obtained by boosting DC BAT voltage Vbat from the BAT 20 at the SUDC 22. That is to say, the driving motor 14 is driven by electric power from the FC 18 and/or BAT 20 (when power running).

The INV 16 and the driving motor 14 together are called "load 30" in the present embodiment. In reality, the load of the fuel cell system includes, in addition to the load 30, the air pump unit 40, an air conditioning device that is omitted from illustration, and the aforementioned low-voltage components.

On the other hand, the secondary side voltage (DC end side voltage) V2 generated at the secondary side 2s of the input end (DC end) of the INV 16 after AC-to-DC conversion occurring due to regenerative operations at the driving motor 14 is either stepped down to BAT voltage Vbat at the SUDC 22 serving as a buck converter and supplied to the BAT 20, or supplied to the BAT 20 in a state where the SUDC 22 is directly connected (switching device 22b off and switching device 22d on), thereby charging the BAT 20. In a case where FC power Pfc for the driving motor 14 from the FC 18 has become excessive, the excess electric power is charged to the BAT 20 by being supplied through the SUC 21 in a boosting state or directly-connected state, and the SUDC 22 in a step-down state or directly-connected state, and the BAT 20 is charged.

The air pump inverter 23 serving as an air pump driving unit also has a three-phase full-bridge configuration for example, and drives the air pump motor 29. The air pump 31 driven by the output of the air pump motor 29 supplies compressed air including oxygen (oxidant gas) to a cathode channel (omitted from illustration) of the FC 18, by a fan of the air pump 31 being rotated.

A hydrogen tank 37 that supplies hydrogen (fuel gas) to an anode channel (omitted from illustration) of the FC 18 is provided externally to the FC 18. Note that the hydrogen and oxidant gas are each called "reactant gas". The FC 18 has a stack structure where cells of the fuel cell device (hereinafter referred to as "FC cells"), formed by an electrolytic film being sandwiched between an anode electrode and cathode electrode, have been layered. Hydrogen-containing gas supplied to the anode electrode through the anode channel is converted into hydrogen ions at an electrode catalyst, and moves through the electrolytic film to the cathode electrode. Electrons generated during this movement are extracted to an external circuit, and provided for use as electric energy generating DC voltage (FC voltage Vfc). The oxidant gas (oxygen-containing gas) is supplied to the cathode electrode via the cathode channel. The hydrogen ions, electrons, and oxidant gas react at this cathode electrode, thereby generating water. Generating water enables the electrolytic film to be maintained in a moist state with a high water inclusion percentage (film humidity), and the reaction can thus be smoothly carried out.

The BAT 20 is an electric storage device (energy storage) including multiple battery cells. Examples include lithium-ion secondary batteries, nickel-hydrogen secondary batteries, and so forth. A capacitor may be also used as the electric storage device. A lithium-ion secondary battery is used in the present embodiment. BAT voltage (battery voltage) Vbat, BAT current (battery current) Ib (discharge current Ibd and charging current Ibc), and BAT temperature (battery temperature) Tb, of the BAT 20, as well as the SOC which is the remaining charge in the BAT 20, are detected and managed by the ECU 24.

As described above, when running, the FC electric power Pfc of the FC 18 is supplied to the driving motor 14 via the INV 16 through the SUC 21, and supplied to the air pump 31 via the air pump inverter 23 and air pump motor 29 (when power running). During external electric power supply when the external electric power supply switch 33 is in an on state, the FC power Pfc is supplied to the external electric power supply unit 34, through the SUC 21 in a directly-connected or step-up state and through the SUDC 22 in a step-down or directly-connected state. While performing external electric power supply, control is effected such that only the FC power Pfc is supplied to the input end of the external electric power supply interface 32 via the SUC 21 and SUDC 22. On the other hand, when running or starting up, meaning not performing external electric power supply, the discharge BAT power Pbatd of the BAT 20 is supplied to the driving motor 14 via the SUDC 22 and through the INV 16 (when power running), and also supplied to the air pump unit 40 when starting the FC automobile 10.

Although various configurations can be used for the SUC 21 and SUDC 22, basically, these are configured including switching devices such as MOSFETs, IGTBs, or the like, diodes, reactors, and capacitors (including smoothing capacitors), with the switching devices being subjected to on/off switching control (duty control) by the ECU 24 based on the requested electric power of the load being connected, which is publically known. Specifically, the SUC 21 is configured including a reactor (inductor) 21a, a switching device 21b, a diode 21c (an element that allows current to pass in one direction and prevents current from flowing in the opposite direction), a smoothing capacitor C1f disposed across the primary side 1sf, and a smoothing capacitor C2f disposed across the secondary side 2s, as illustrated in FIG. 2. The FC voltage Vfc is boosted to the predetermined secondary side voltage V2 by the switching device 21b being placed in a switching state (duty control) by way of the ECU 24 serving as a converter controller.

If the duty (driving duty) is 0% and the switching device 21b is kept in an off state (open state), the FC 18 and load 30 are in a directly connected state via the reactor 21a and diode 21c (hereinafter referred to as "FC direct-connection state" or "FCVCU direct-connection state", and the FC voltage Vfc is directly connected to the secondary side voltage V2 (V2=Vfc−Vd≈Vfc and Vd<<Vfc, where Vd represents the forward voltage drop of the diode 21c). The diode 21c acts to boost or to direction connect and prevent backflow. Accordingly, in addition to boosting operations (when power running or the like), the SUC 21 also performs backflow prevention operations and direct connection operations (when power running or the like).

On the other hand, the SUDC 22 is configured including a reactor 22a, switching devices 22b and 22d, diodes 22c and 22e respectively connected in parallel with these switching devices 22b and 22d, a smoothing capacitor C1b disposed across the primary side 1sb, and a smoothing capacitor C2b disposed across the secondary side 2s. When boosting, the ECU 24 puts the switching device 22d in an off state, and switching (duty control) the switching device 22b boosts the BAT voltage Vbat (electric storage device voltage) to the predetermined secondary side voltage V2 (when power running). When reducing, the ECU 24 puts the switching device 22b in an off state, and switching (duty control) the switching device 22d causes the diode 22c to function as a flywheel diode when the switching device 22d is in an off state, so the secondary side voltage V2 drops to the BAT voltage Vbat of the BAT 20 (during regeneration charging and/or charging by the FC 18).

If the duty (driving duty) of the switching device 22b is 0% in an off state, and the duty of the switching device 22d is 100% in an on state, the BAT 20 and load 30 are in a directly-connected state (when power running, charging, or when driving component loads or the like, hereinafter also referred to as "BAT direct-connection state" or "BATVCU direct-connection state"). In the BAT direct-connection state, the BAT voltage Vbat of the BAT 20 is the secondary side voltage V2 (Vbat≈V2). In practice, the secondary side voltage V2 of the BAT 20 in the BAT direct-connection state when power running is "Vbat−forward voltage drop of diode 22e", and the secondary side voltage V2 when charging (including regeneration charging) is "Vbat=V2−on voltage of switching device 22b=Vbat (assuming that the on voltage of the switching device 22d is 0 V)". Note that electric power devices such as IGBTs or the like may be used for the switching devices 21b, 22b, and 22d, besides the illustrated MOSFETs.

Arrangements, omitted from illustration, may be made to the FC system 12, where a diode is provided of which the anode terminal is connected to the primary side 1sf of the SUC 21 and the cathode terminal is connected to the secondary side 2s and/or a diode is provided of which the anode terminal is connected to the primary side 1sb of the SUDC 22 and the cathode terminal is connected to the secondary side 2s, to reduce DC voltage drop at the SUC 21 or SUDC 22 when the SUC 21 is directly connected, which is synonymous with the FC 18 being directly connected, or when the SUDC 22 is directly connected (when power running), which is synonymous with the BAT 20 being directly connected.

Figure 3:
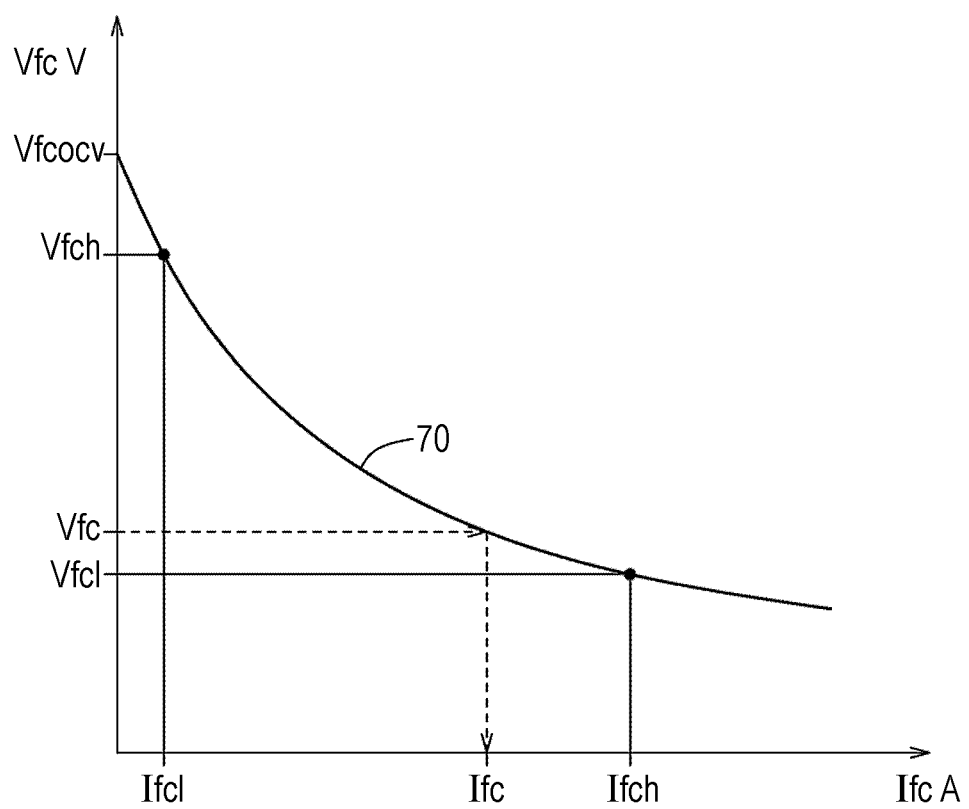
FIG. 3 illustrates a current-voltage characteristic curve of a fuel cell.

The FC 18 has a known current-voltage (IV) characteristic 70 where the lower the FC voltage Vfc is than the FC open-circuit voltage Vfcocv, the more the FC current Ifc increases, as illustrated in FIG. 3. That is to say, an FC current Ifch in a case where the FC voltage Vfc is a relatively high FC voltage Vfcl is a greater current in comparison with an FC current Ifcl in a case where the FC voltage Vfch is a relatively high FC voltage Vfch. Note that the larger the FC current Ifc is (the lower the FC voltage Vfc is), the larger the FC power Pfc is.

When the SUC 21 is directly connected, the FC voltage Vfc of the FC 18 is controlled by the secondary side voltage V2 decided by the boost ratio (V2/Vbat) of the SUDC 22 in a boosting state (switching state) or the drop ratio (Vbat/V2) of the SUDC 22 in a reducing state (switching state). The secondary side voltage V2 serves as a command voltage (target voltage) of the SUDC 22. Once the FC voltage Vfc is decided, the FC current Ifc is controlled (decided) following the IV characteristic 70. When the SUC 21 is boosting and the SUDC 22 is directly connected, the voltage at the primary side 1sf of the SUC 21, i.e., the FC voltage Vfc serves as the command voltage (target voltage) of the SUC 21, the FC current Ifc is decided following the IV characteristic 70, and the boost ratio (V2/Vfc) of the SUC 21 is decided so as to be a desired secondary side voltage V2.

Feedback (FB) control is performed in the present embodiment where the duty of the switching device 21b is adjusted by the ECU 24 serving as a converter controller when the SUC 21 is boosting, so that the FC voltage Vfc is at a command value (set value, target value). However, since the FC voltage Vfc and the FC current Ifc are in a unique relationship based on current-voltage characteristics, feedback (FB) control may be performed where the duty of the switching device 21b is adjusted by the ECU 24 so that the FC current Ifc is at a command value (set value, target value).

The ECU 24 controls the driving motor 14, INV 16, FC 18, BAT 20, SUC 21, SUDC 22, air pump unit 40, external electric power supply unit 34, and like components, via a communication line 68 (see FIG. 2). This control is performed by executing a program stored in memory (read only memory (ROM)) of the ECU 24, using detection values of various sensors and on/off information of various switches. The various sensors include a voltage sensor, current sensor, temperature sensor, pressure sensor, hydrogen concentration sensor, various types of revolution sensors, accelerator pedal angle sensor, and so forth, all omitted from illustration. The switches include an air condition switch, ignition switch, and so forth.

The ECU 24 is a calculator that has a microprocessor, including a central processing unit (CPU), memory in the form of ROM (including electronically erasable and programmable ROM (EEPROM)) and random access memory (RAM), and further input output devices such as an A/D converter and D/A converter, a timer serving as a clock unit, and so forth. The ECU 24 functions as various types of function realizing units, such as for example a control unit, computing unit, processing unit, and so forth, by the CPU reading out and executing the program recorded in the ROM. The ECU 24 is not restricted to a configuration of a single ECU, and may be configured including multiple ECUs.

The ECU 24 decides the distribution (assignation) of the load which the FC 18 should bear (load power), the load which the BAT 20 should bear (load power), and the load which the regenerative power source (driving motor 14) should bear (load power), while arbitrating among these, in accordance with the load (load power) that the overall FC automobile 10 requires of the FC system 12, based on the state of the FC 18, the state of the BAT 20, the state of the driving motor 14, and further input values from the various switches and various sensors. The ECU 24 accordingly controls the driving motor 14, INV 16, air pump unit 40, external electric power supply interface 32, FC 18, BAT 20, SUC 21, and SUDC 22. That is to say, the ECU 24 performs energy management of the overall FC automobile 10 including the FC 18, BAT 20, load 30, external electric power supply unit 34, and low-voltage components.

Further, when using the FC automobile 10 not as a vehicle but as an electric power supply system, the ECU 24 controls the FC 18, BAT 20, SUC 21, and SUDC 22, air pump unit 40, and external electric power supply unit 34, in accordance with the load (load power) that the overall electric power supply system requires of the FC system 12, based on the state of the FC 18, the state of the BAT 20, the state of the external load 35, and further input values from the various switches and various sensors. That is to say, the ECU 24 performs energy management of the overall FC system 12 including the FC 18 and BAT 20.

So far, the basic configuration of the FC automobile 10, to which the fuel cell system 12 according to the present embodiment has been applied, has been described. Next, examples of control processing carried out by the ECU 24 will be described with reference to the timing chart in FIG. 4 and the flowchart in FIG. 5. Note that the executing entity of the program according to the flowchart illustrated in FIG. 5 is the CPU of the ECU 24.

Figure 4:
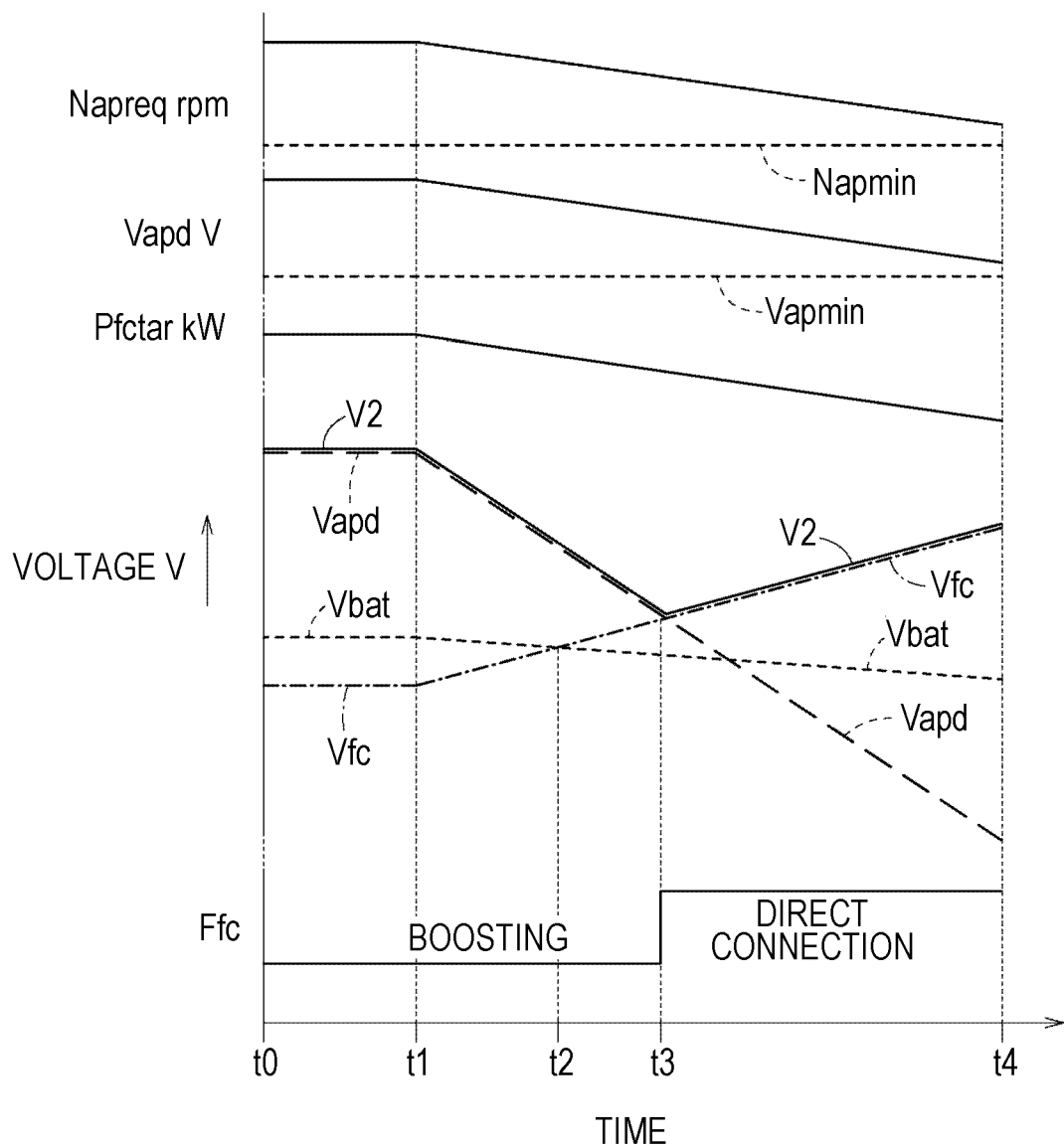
FIG. 4 is a timing chart provided for description of operations of the embodiment.

The items on the vertical axis in FIG. 4 are, in order from the top down, requested air pump revolutions Napreq of the air pump 31, required air pump voltage Vapd (V) satisfying this requested air pump revolutions Napreq, target electric power Pfctar for the FC 18 (target FC electric power), required air pump voltage Vapd (V) re-plotted, secondary side voltage V2, BAT voltage Vbat, FC voltage Vfc, and FC direct-connection flag Ffc, representing how these items change over time. The FC direct-connection flag Ffc represents the operation state of the SUDC 22 which is the voltage transducer at the BAT 20 side, with low level indicating that the SUC 21 is in a boosting state, and high level indicating that the SUC 21 is in a directly-connected state.

Figure 5:
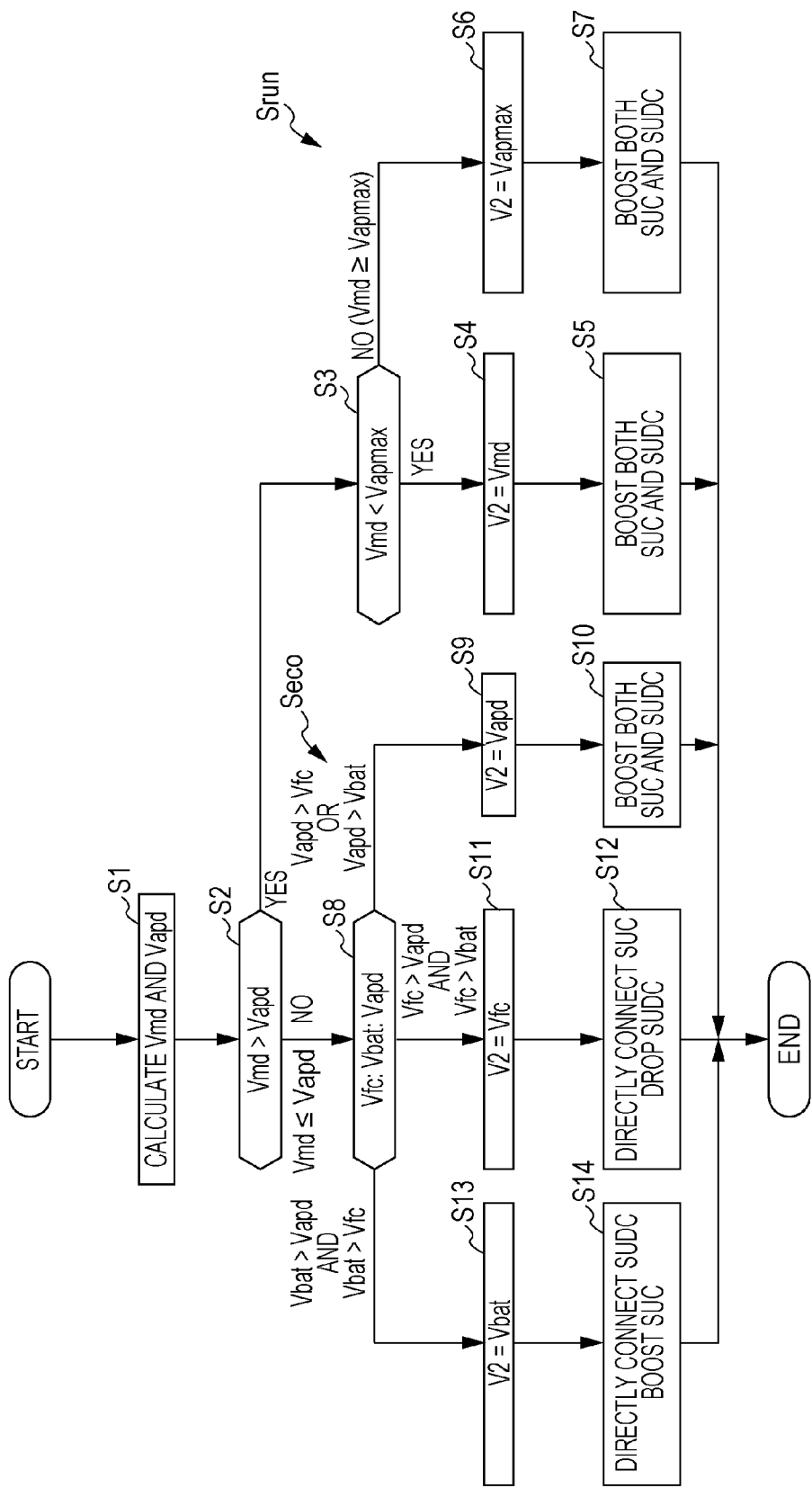
FIG. 5 is a flowchart provided for description of operations of the embodiment.
Figure 6:
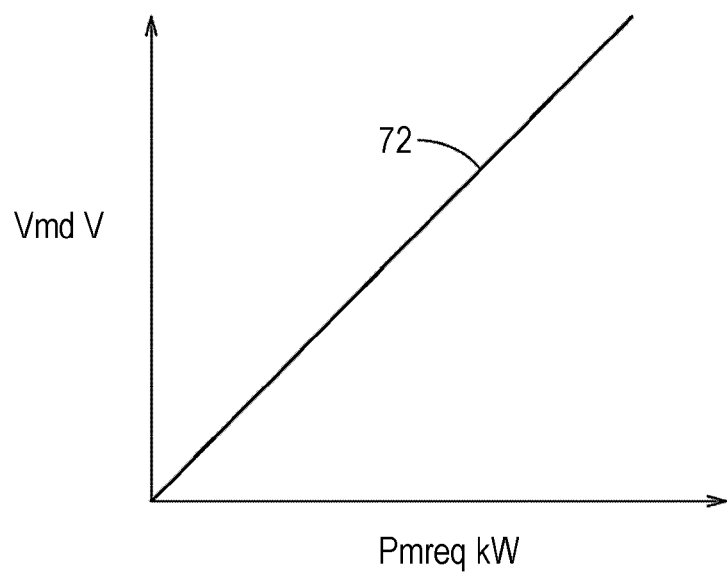
FIG. 6 is a properties diagram illustrating the relationship between requested motor electric power and required motor voltage.

In step S1 in the flowchart in FIG. 5, the ECU 24 calculates the required motor voltage Vmd and required air pump voltage Vapd. To calculate the required motor voltage Vmd, the ECU 24 first calculates requested motor power Pmreq (kW) of the driving motor 14 by referencing a properties map (not illustrated) of required torque Treq (N·m) as to motor revolutions Nm (rpms), in accordance with the amount of pedal operation (accelerator angle) θp and vehicular speed Vs (km/h). Next, the ECU 24 references a property 72 illustrated in FIG. 6, to calculate the required motor voltage Vmd proportionate to the requested motor power Pmreq. The required motor voltage Vmd is the minimum required voltage for the secondary side voltage V2 of the SUC 21 or SUDC 22, applied to the DC end of the inverter 16 to realize the requested motor power Pmreq.

The required air pump voltage Vapd is calculated based on the requested air pump revolutions Napreq. In this case, the ECU 24 first calculates the requested motor power Pmreq (Pmreq=0 in case of external electric power supply) or external supply electric power Pext and target generated electric power Pfctar for the FC 18 handling requested power for components such as air conditioning and the like that are omitted from illustration. The ECU 24 then calculates the requested air pump revolutions Napreq capable of generating a target air flow for supply to the FC 18 that is necessary to generate the target generated electric power Pfctar. The ECU 24 next calculates the required air pump voltage Vapd based on the requested air pump revolutions Napreq. In this case, the hydrogen flow basically is set corresponding to the target generated electric power Pfctar, and is configured so that the amount of hydrogen supplied from the hydrogen tank 37 through a regulator (omitted from illustration) increases when the hydrogen flow increases, for example. The required air pump voltage Vapd may be calculated (decided) based on target air pump power consumption or air pump torque, besides being calculated (decided) based on the requested air pump revolutions Napreq.

Figure 7:
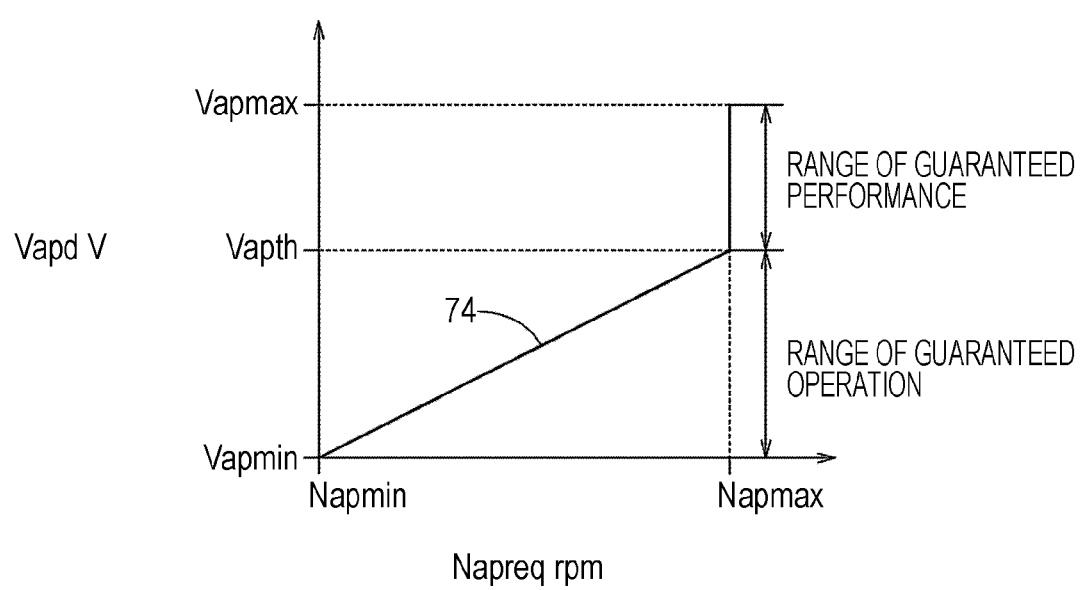
FIG. 7 is a properties diagram illustrating the relationship between requested air pump revolutions and required air pump voltage.

FIG. 7 illustrates a property 74 representing the relationship between requested air pump revolutions Napreq (rpms) and required air pump voltage Vapd (volts (V)). The property 74 is stored in a storage device within the ECU 24, having been obtained by experimentation and simulation beforehand.

When the required air pump voltage Vapd is set within a voltage range from a threshold voltage Vapth to an upper limit air pump voltage Vapmax (Vapth≤Vapd≤Vapmax), the performance of the air pump 31 can be fully utilized in the rated range (between minimum revolutions Napmin and maximum revolutions Napmax), which is a range of guaranteed performance of the air pump unit 40. When the required air pump voltage Vapd is set within a voltage range from a threshold voltage Vapth to a lower limit air pump voltage Vapmin (Vapmin≤Vapd≤Vapth), this is a range where operation of the air pump unit 40 is guaranteed, and the revolutions of the air pump 31 (air pump revolutions Nap) are restricted to the rated range (predetermined revolutions between minimum revolutions Napmin and maximum revolutions Napmax) following the property 74. Also, the performance of the air pump 31 is restricted in the range of guaranteed operation where the required air pump voltage Vapd is a voltage at the threshold voltage Vapth or lower, to the lower limit air pump voltage Vapmin that corresponds to a minimum operation guaranteed revolutions Napmin.

In the following step S2, determination is made regarding whether or not the required motor voltage Vmd is larger than the required air pump voltage Vapd. In a case where the required motor voltage Vmd is larger than the required air pump voltage Vapd (Vmd>Vapd; YES in step S2), the processing of step Srun (S3 through S7), where priority is given to running electric power, is executed.

In this case, first, in step S3, determination is made regarding whether or not the required motor voltage Vmd is smaller than the upper limit air pump voltage Vapmax. In a case where the required motor voltage Vmd is smaller than the upper limit air pump voltage Vapmax (Vmd<Vapmax; YES in step S3), in step S4 the secondary side voltage V2 is set to the required motor voltage Vmd (V2=Vmd). Then in step S5, the SUC 21 and SUDC 22 are both set to a boosting state to boost the FC voltage Vfc to the secondary side voltage V2=Vmd, and the BAT voltage Vbat is also boosted to the secondary side voltage V2=Vmd. Accordingly, merchantability (in this case, drivability) is ensured.

In a case where the required motor voltage Vmd is not smaller than the upper limit air pump voltage Vapmax (Vmd≥Vapmax; NO in step S3), in step S6 the secondary side voltage V2 is set to the upper limit air pump voltage Vapmax (V2=Vapmax). Then in step S7, the SUC 21 and SUDC 22 are both set to a boosting state to boost the FC voltage Vfc to the secondary side voltage V2=Vapd, and the BAT voltage Vbat is also boosted to the secondary side voltage V2=Vapd.

Thus, in a case where the required motor voltage Vmd is larger than the required air pump voltage Vapd (Vmd>Vapd; YES in step S2), the air pump driving voltage Vap is controlled as in step S4 (V2=Vmd) or step S6 (V2=Vapmax), so a situation where air pump driving voltage Vap is insufficient and the FC power Pfc of the FC 18 falls below the target FC power Pfctar can be prevented.

In the other hand, in a case where determination is made in step S2 that the required motor voltage Vmd is not larger than the required air pump voltage Vapd (Vmd≤Vapd; NO in step S2), the processing of electricity conservation step (air pump efficiency priority processing) Seco (S8 through S14), where priority is given to efficiency of the air pump unit 40 (air pump 31), is executed.

In this case, first in step S8, the relationship in magnitude between the FC voltage Vfc and BAT voltage Vbat and required air pump voltage Vapd is determined. In a case where the determination of Expression (1)

$$Vapd>Vfc \text{ or } Vapd>Vbat \qquad \text{Expression (1)}$$

holds in the determination of magnitude in step S8, in step S9 the secondary side voltage V2 is set to the required air pump voltage Vapd (V2=Vapd). In step S10, the FC voltage Vfc is boosted by the SUC 21 to the required air pump voltage Vapd, and also the BAT voltage Vbat is boosted by the SUDC 22 to the required air pump voltage Vapd, in the period of point-in-time t0 through point-in-time t3 illustrated in FIG. 4. Accordingly, the requested air pump revolutions Napreq is secured, and also the required motor voltage Vmd (Vmd≤Vapd) is secured as well.

In a case where the determination of Expression (2)

$$Vfc>Vapd \text{ and } Vfc>Vbat \qquad \text{Expression (2)}$$

holds in step S8, in step S11 the secondary side voltage V2 is set to FC voltage Vfc (V2=Vfc), and the direct-connection flag Ffc of the SUC 21 is set from low level, which means boosting, to high level, which means direct connection. In step S12, the switching device 21b is turned off in the period of point-in-time t3 to point-in-time t4 illustrated in FIG. 4, thereby setting the SUC 21 in a directly-connected state, and setting the secondary side voltage V2 to FC voltage Vfc. In this case, the SUDC 22 boosts the BAT voltage Vbat to the required air pump voltage Vapd, i.e., to the FC voltage Vfc. Accordingly, in this case as well, the requested air pump revolutions Napreq is secured, and also the required motor voltage Vmd is secured as well. Moreover, the SUC 21 is in a directly-connected state, so the switching loss of the SUC 21 is zero, and system efficiency is improved.

In a case where the determination of Expression (3)

$$Vbat>Vapd \text{ and } Vbat>Vfc \qquad \text{Expression (3)}$$

holds in step S8, in step S13 the secondary side voltage V2 is set to BAT voltage Vbat (V2=Vbat), an unshown direct-connection flag Fbat of the SUDC 22 is set from low level, which means boosting, to high level, which means direct connection. In step S14, the switching devices 22b and 22d are turned off, thereby placing the SUDC 22 in a directly-connected state, and the secondary side voltage V2 is set to the BAT voltage Vbat. In this case, the SUC 21 boosts the FC voltage Vfc to the required air pump voltage Vapd, which is the BAT voltage Vbat. Accordingly, in this case as well, the requested air pump revolutions Napreq is secured, and also the required motor voltage Vmd is secured as well. Moreover, the SUDC 22 is in a directly-connected state, so the switching loss of the SUDC 22 is zero, and system efficiency is improved.

First Modification

Figure 8:
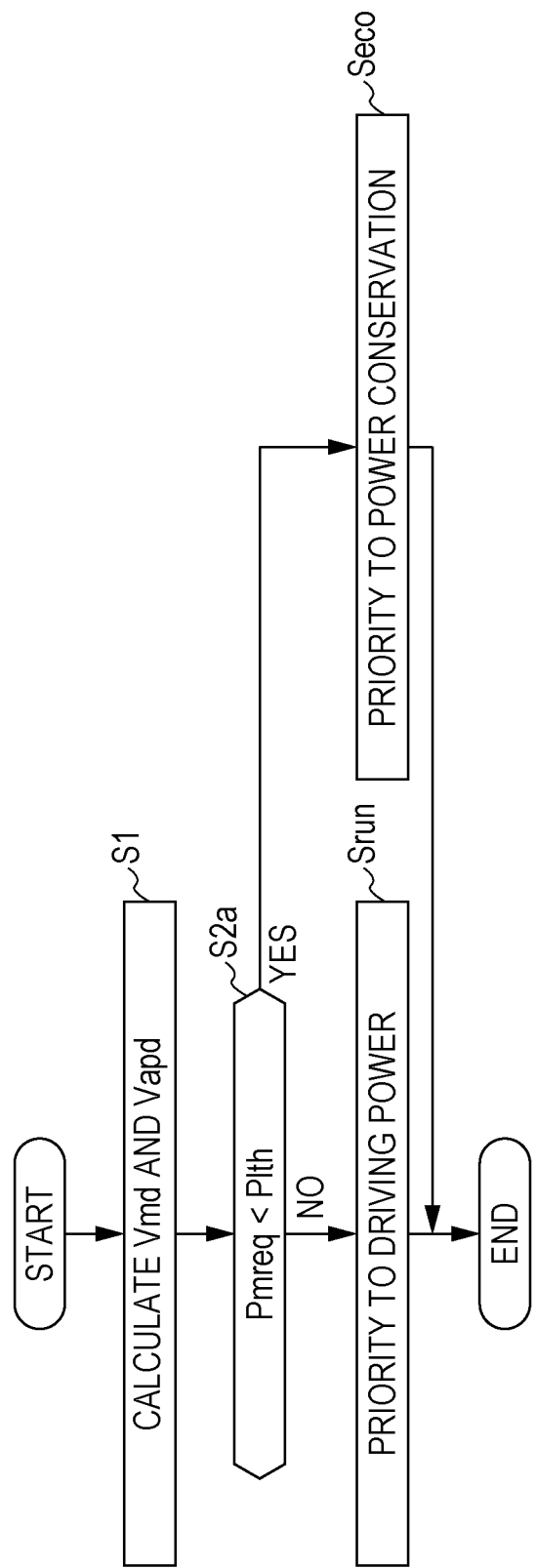
FIG. 8 is a flowchart provided for description of operations of a first modification of the embodiment.

The above-described flowchart in FIG. 5 may be replaced by the flowchart in FIG. 8. In a first modification, the determination in step S2 in the flowchart in FIG. 5 is changed to the determination of step S2a in the flowchart in FIG. 8. In step S2a, determination is made regarding whether or not the requested motor power Pmreq is smaller than a low-load power threshold value Plth where the requested motor power Pmreq can be determined to be low-load. If smaller (YES in step S2a; Pmreq<Plth), the processing of step Seco (S8 through S14), where priority is given to efficiency of the air pump 31 (air pump unit 40), is executed. If not smaller (NO in step S2a; Pmreq≥Plth), the running electric power priority processing of step Srun (S3 through S7), where priority is given to motor driving, is executed. Note that the low-load power threshold value Plth is set to 0 kW (Plth=0 kW) where determination is made regarding whether or not the driving motor 14 is regenerating, or a value around 1 to 10 kW.

Second Modification

Figure 9:
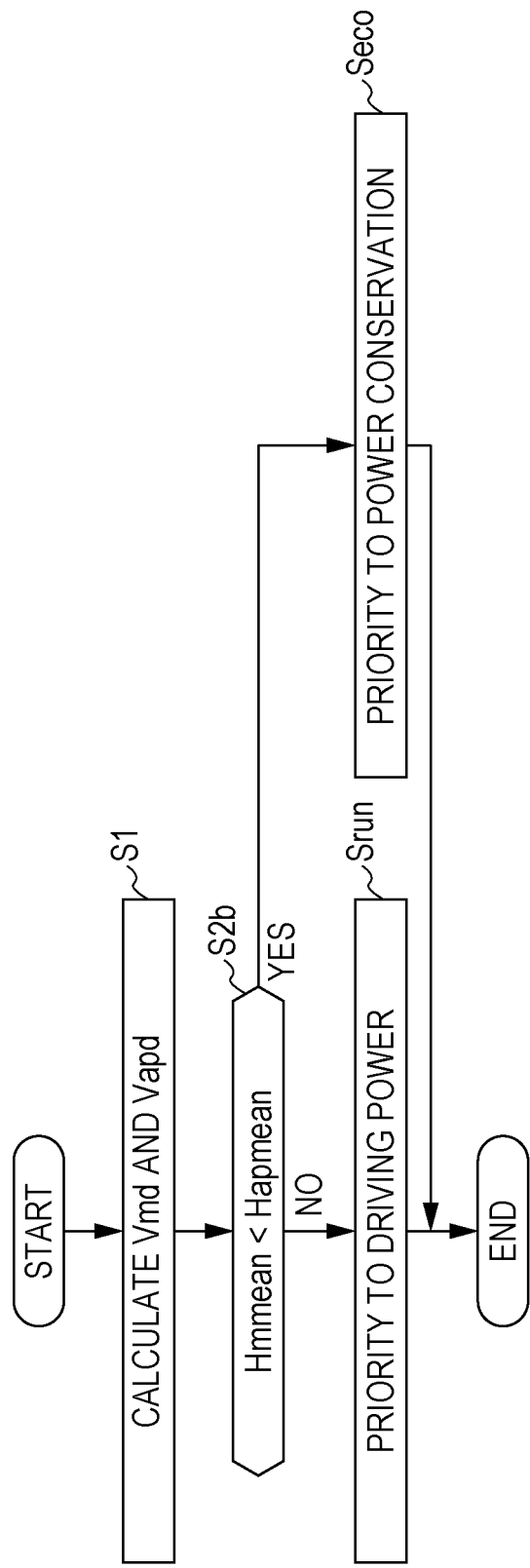
FIG. 9 is a flowchart provided for description of operations of a second modification of the embodiment.

The above-described flowchart in FIG. 5 may be replaced by the flowchart in FIG. 9. In a second modification, the determination in step S2 in the flowchart in FIG. 5 is changed to the determination of step S2b in the flowchart in FIG. 9. In step S2b, determination is made regarding whether or not an average efficiency Hmmean of the load 30 is smaller or not than an average efficiency Hapmean of the air pump unit 40. If smaller (YES in step S2b; Hmmean<Hapmean), the processing of step Seco (S8 through S14), where priority is given to efficiency of the air pump 31 (air pump unit 40), is executed. If not smaller (NO in step S2b; Hmmean≥Hapmean), the running electric power processing of step Srun (S3 through S7), where priority is given to motor driving, is executed.

The average efficiency Hmmean of the load 30, and the average efficiency Hapmean of the air pump unit 40, may be obtained beforehand as the average value of the efficiency of the load 30 (ratio of actual electric power consumption of the load 30 as to the electric power supplied to the load 30), or average value of movement, and the average value of the efficiency of the air pump unit 40 (ratio of actual electric power consumption of the air pump unit 40 as to the electric power supplied to the air pump unit 40), or average value of movement, with regard to results of the Japanese JC08 mode testing or LA-4 mode testing used in the USA and other nations. These average values are then subjected to the comparison processing in step S2b during mode running. An arrangement may be made in the second modification where the average efficiency of high-voltage components combining the electric power of the air pump unit 40 and the electric power of an unshown air conditioning device (also Hmmean) and the average efficiency Hmmean of the load 30 are compared.

Third Modification

Figure 10:
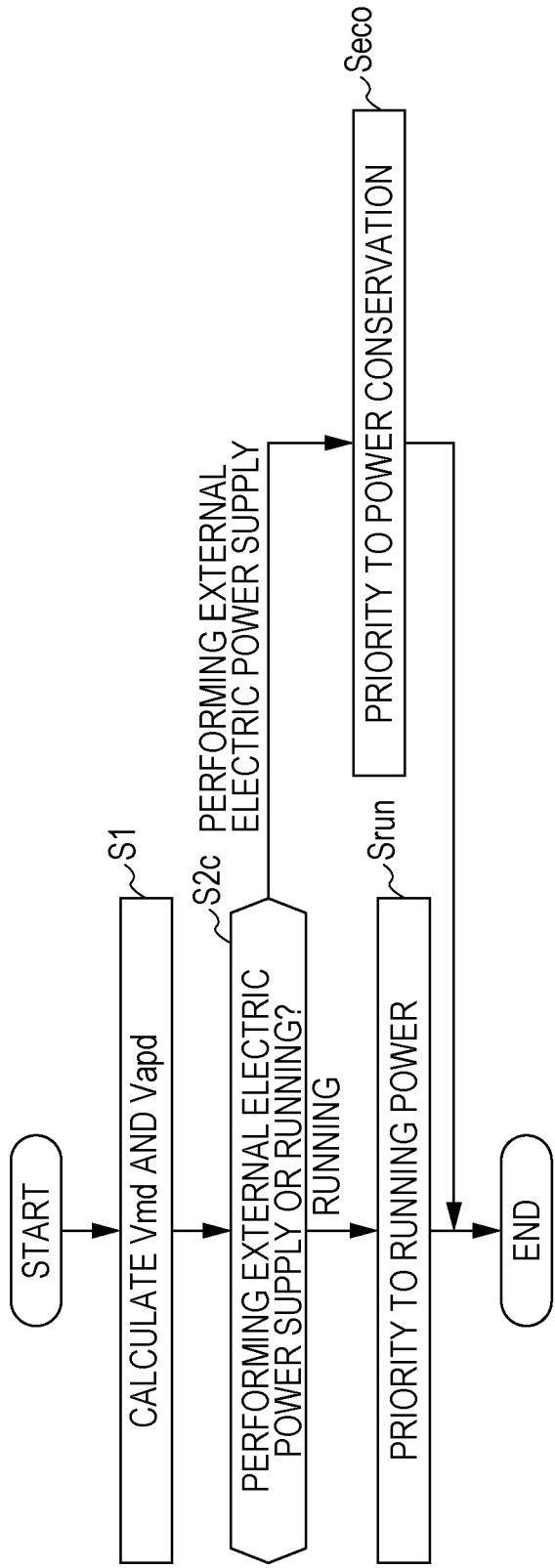
FIG. 10 is a flowchart provided for description of operations of a third modification of the embodiment.

The above-described flowchart in FIG. 5 may be replaced by the flowchart in FIG. 10. In a third modification, the determination in step S2 in the flowchart in FIG. 5 is changed to the determination of step S2c in the flowchart in FIG. 10. In step S2c, determination is made regarding whether the vehicle 10 is performing external electric power supply or is running. If running (RUNNING in step S2c), the processing of the running power priority step Srun (S3 through S7), where priority is given to motor driving, is executed.

Figure 11:
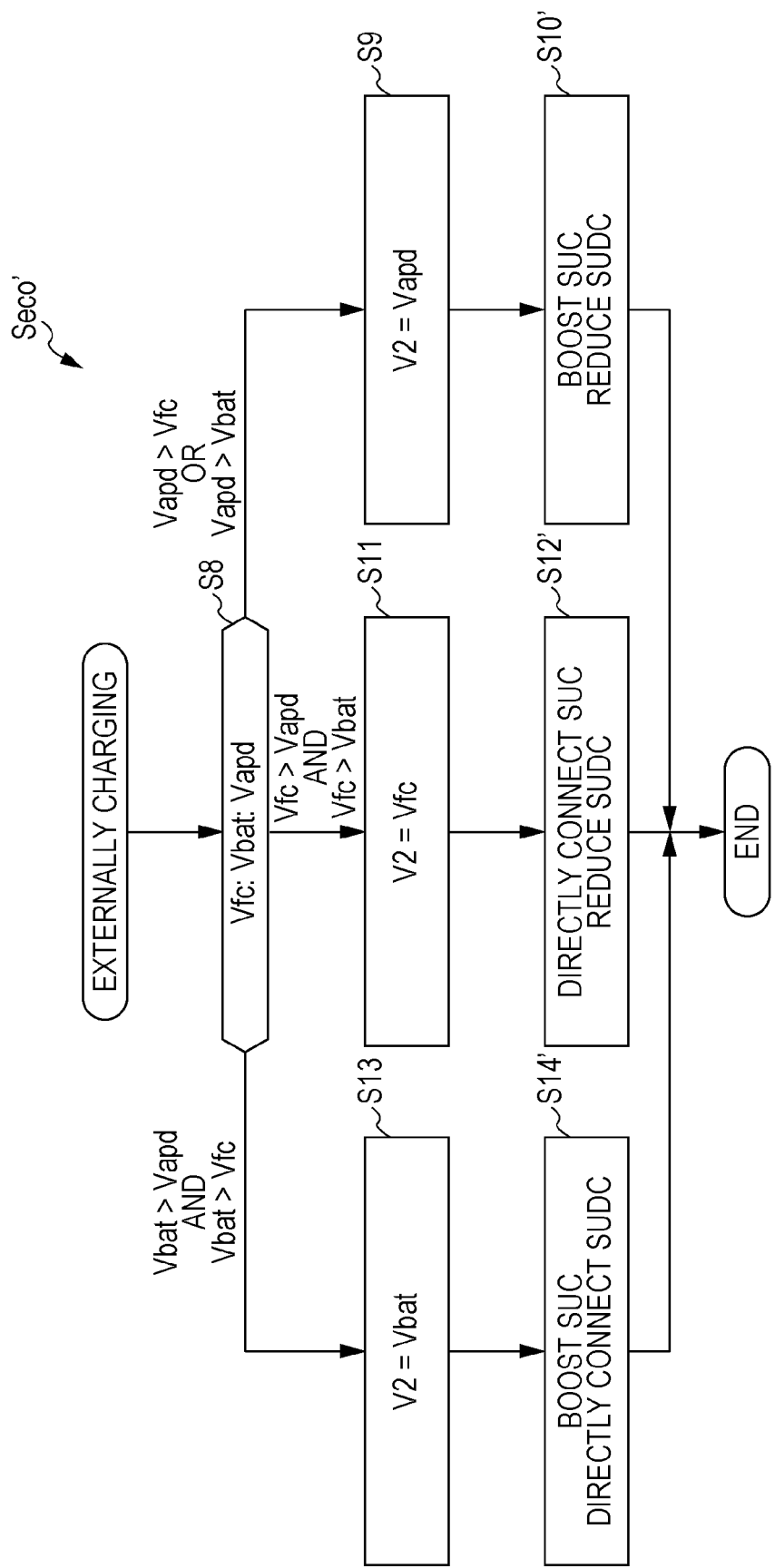
FIG. 11 is a detailed flowchart of processing giving priority to electricity conservation, in a case of performing external electric power supply.

On the other hand, in a case where determination is made that the vehicle 10 is performing external electric power supply with the switch 33 in an on state (PERFORMING EXTERNAL ELECTRIC POWER SUPPLY in step s2c), the processing of step Seco' (steps S8, S9, S10', S11, S12', S13, S14') of processing where priority is given to electricity conservation during external electric power supply illustrated in FIG. 11, where priority is given to efficiency of the air pump 31 (air pump unit 40), is executed. Step Seco' corresponds to the above-described step Seco (S8 through S14) of processing where priority is given to electricity conservation.

In a case where the determination of the above Expression (1) (Vapd>Vfc or Vapd>Vbat) holds in the determination of magnitude in step S8, in step S9 the secondary side voltage V2 is set to the required air pump voltage Vapd (V2=Vapd). In step S10', the FC voltage Vfc is boosted by the SUC 21 to the required air pump voltage Vapd, and the required air pump voltage Vapd is reduced by the SUDC 22 to BAT voltage Vbat. Accordingly, the current (electric power) output (supply) from the BAT 20 to the external load 35 via the SUC 21, SUDC 22, and external electric power supply interface 32, and be made to be zero. In this case, the BAT voltage Vbat is open circuit voltage (OCV), so charge/discharge loss of the BAT 20 also is zero.

In a case where the determination of the above Expression (2) (Vfc>Vapd and Vfc>Vbat) holds in step S8, in step S11 the secondary side voltage V2 is set to FC voltage Vfc (V2=Vfc), and step S12' the SUC 21 is directly connected and the FC voltage Vfc is lowered by the SUDC 22 to the BAT voltage Vbat. Accordingly, the external load 35 is supplied with the FC power Pfc through the SUC 21 and SUDC 22, and in this case as well, current (electric power) output (supply) from the BAT 20 can be made to be zero.

In a case where the determination of the above Expression (3) (Vbat>Vapd and Vbat>Vfc) holds in step S8, in step S13 the secondary side voltage V2 is set to BAT voltage Vbat (V2=Vbat), in step S14' the SUC 21 boosts the FC voltage Vfc to BAT voltage Vbat, and the SUDC 22 is set to a directly-connected state (switching device 22b off, switching device 22d on). Accordingly, the external load 35 is supplied with the FC power Pfc through the SUC 21 and SUDC 22, and in this case as well, current (electric power) output (supply) from the BAT 20 can be made to be zero.

Conclusion of Embodiment, and Modifications

The embodiment described above relates to energy management control in the FC system 12 that has the two voltage transducers of SUC 21 and SUDC 22, where the air pump 31 is disposed at secondary side 2s side of the SUDC 22. In a case where the air pump unit 40 including the air pump 31 is disposed at the secondary side 2s side, the air pump driving voltage Vap and the motor driving voltage Vm become equal. Accordingly, the required air pump voltage Vapd is taken into consideration when setting the required motor voltage Vmd. Accordingly, the required air pump voltage Vapd can be secured, and a situation where power performance is insufficient does not occur.

In further detail, the FC system 12 according to the above-described embodiment includes the FC 18 that generates electricity by causing reaction of oxidant gas and hydrogen, and outputs the FC voltage Vfc, the BAT 20 that outputs BAT voltage Vbat, the load 30 made up of the inverter 16 and the driving motor 14 driven by the inverter 16, the SUC 21 serving as a first voltage transducer that performs voltage conversion (boosting) of the FC voltage Vfc of the FC 18 and applies as secondary side voltage V2 to the DC end side of the inverter 16, the SUDC 22 serving as a second voltage transducer that performs voltage conversion (boosting) of the BAT voltage Vbat of the BAT 20 and applies as secondary side voltage V2 to the DC end side of the inverter 16, and the air pump 31 that is driven through the air pump inverter 23 and air pump motor 29. The air pump 31 supplies (pumps) the air serving as the oxidant gas to the FC 18 upon being driven through the air pump inverter 23 and air pump motor 29 to which the secondary side voltage V2 is applied.

The control method of the FC system 12 includes: a required air pump voltage setting step (step S1) of setting the required air pump voltage Vapd, regarding which application to the air pump inverter 23 is required in accordance with the target generated electric power Pfctar of the FC 18; and a voltage transducer voltage setting step (steps S5, S7, S9, S10, S10', S11, S12, S12', S13, S14, S14') of setting the secondary side voltage V2 of the SUC 21 and SUDC 22, to satisfy the required air pump voltage Vapd.

According to this embodiment, the secondary side voltage V2 of the SUC 21 and SUDC 22 is set to the secondary side voltage V2, to satisfy the required air pump voltage Vapd, so a situation where air pump driving voltage Vap is insufficient and the FC power Pfc of the FC 18 falls below the target generated electric power Pfctar can be prevented. In a case where the driving motor 14 is in a low-load state, the required air pump voltage Vapd is set to the secondary side voltage V2, so system efficiency can be improved.

In this case, the control method may further include: a required motor voltage setting step (step S1) of setting the required motor voltage Vmd in accordance with driving request of the driving motor 14; and a voltage comparing step (step S2) of comparing the required motor voltage Vmd with the required air pump voltage Vapd. In the voltage transducer voltage setting step, in a case where the required motor voltage Vmd is a higher voltage than the required air pump voltage Vapd, the required motor voltage Vdm is set to the secondary side voltage V2 of the SUC 21 and SUDC 22 (step S4). In a case where the required motor voltage Vmd is a voltage equal to or lower than the required air pump voltage Vapd, one of the FC voltage Vfc, the BAT voltage Vbat, and the required air pump voltage Vapd, that is the highest voltage, is set to the secondary side voltage V2 of the SUC 21 and SUDC 22 (steps S9, S11, S13).

Thus, the required air pump voltage Vapd can be secured by a convenient method.

The control method may further include: an external electric power supply determination step (step S2c) of determining whether or not external electric power supply, where external electric power supply is performed from the FC system 12 externally, is to be performed; an air pump revolutions setting step (step S1, step Seco') of setting air pump revolutions Nap necessary to enable the fuel cell to generate FC power Pfc in accordance with external electric power supply electric power Pext, in a case where determination is made that electric power supply is to be performed, a requested air pump efficiency voltage calculating unit of calculating the required air pump voltage Vapd based on the set air pump revolutions Nap, and a voltage transducer voltage setting step, in which one of the BAT voltage Vbat, the FC voltage Vfc, and the required air pump voltage Vapd, that is the highest voltage, is set to the secondary side voltage V2, and the boosting state and directly connected state of the SUC 21 and SUDC 22 and the other voltage transducer are controlled, so that the electric power balance (charging/discharging) of the BAT 20 is zero.

Thus, the required air pump voltage Vapd is set to the secondary side voltage V2 of the SUC 21 and SUDC 22 during external electric power supply when driving of the driving motor 14 is unnecessary, so more efficient external electric power supply can be performed by the FC power Pfc.

Figure 12A:
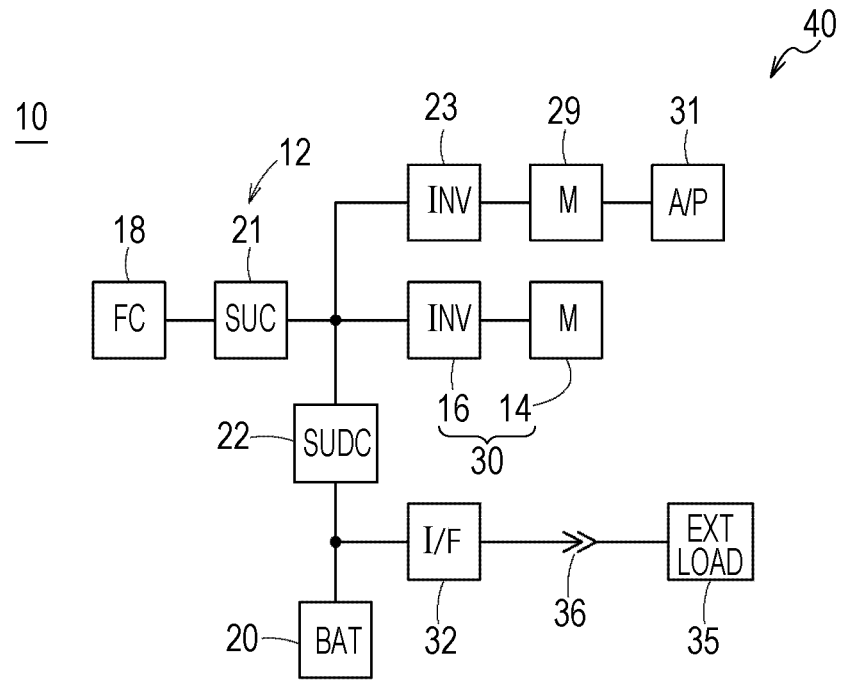
FIG. 12A is a conceptual diagram of a fuel cell automobile to which the fuel cell system according to the embodiment has been applied.
Figure 12B:
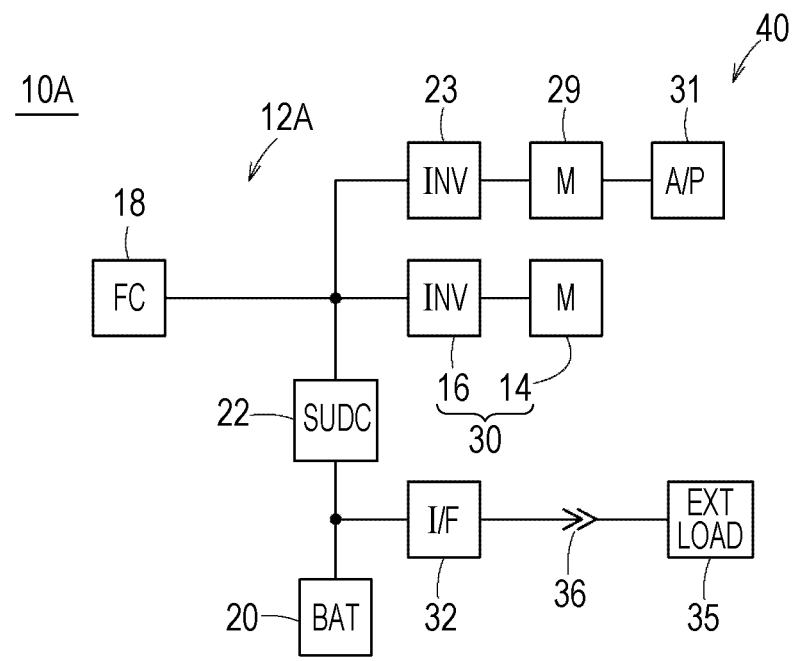
FIG. 12B is a conceptual diagram of a fuel cell automobile to which the fuel cell system according to another embodiment has been applied.

The present disclosure is not restricted to being applied to the FC automobile 10 having the FC system 12 according to above-described embodiment, illustrated in the conceptual diagram in FIG. 12A. It is needless to say that various configurations may be made, such as application to an FC automobile 10A having an FC system 12A from which the SUC 21 has been omitted, such as illustrated in the conceptual diagram in FIG. 12B.

According to a first aspect of the present disclosure, a control method of a fuel cell system is provided. The fuel cell system includes a fuel cell that generates electricity by causing reaction of an oxidant gas and a fuel gas, and outputs a fuel cell voltage, an electric storage device that outputs electric storage device voltage, a motor that is driven by a motor driving unit, a voltage transducer that converts voltage between the electric storage device voltage serving as a primary side voltage and motor driving voltage serving to a secondary side voltage that is applied to the motor driving unit, and an air pump that is driven through an air pump driving unit, and upon being driven through the air pump driving unit to which the secondary side voltage is applied, the air pump supplies oxidant gas to the fuel cell. The method includes: a required air pump voltage setting step of setting a required air pump voltage, regarding which application to the air pump driving unit is required in accordance with a target generated electric power of the fuel cell; and a voltage transducer voltage setting step of setting the secondary side voltage of the voltage transducer, to satisfy the required air pump voltage.

According to this configuration, the secondary side voltage of the voltage transducer is set so as to satisfy the required air pump voltage, so a situation where the air pump driving voltage is insufficient and the generated electric power of the fuel cell falls below the target generated electric power, resulting in lower motor power performance, can be prevented.

In this case, the control method may further include: a required motor voltage setting step of setting a required motor voltage in accordance with driving request of the motor; and a voltage comparing step of comparing the required motor voltage with the required air pump voltage. In the voltage transducer voltage setting step, in a case where the required motor voltage is a higher voltage than the required air pump voltage, the required motor voltage may be set to the secondary side voltage of the voltage transducer. In a case where the required motor voltage is a voltage equal to or lower than the required air pump voltage, one of the fuel cell voltage, the electric storage device voltage, and the required air pump voltage, that is the highest voltage, may be set to the secondary side voltage of the voltage transducer, within a range of satisfying the required air pump voltage.

Thus, in a case where the required motor voltage is higher than the required air pump voltage, the required motor voltage is set to the secondary side voltage of the voltage transducer, thereby securing motor power performance. On the other hand, in a case where the required motor voltage is lower than the required air pump voltage, the secondary side voltage of the voltage transducer, which is to say the air pump driving voltage, is set within a range to satisfy the required air pump voltage rather than the required motor voltage. Accordingly, system efficiency can be improved in a low-load state (required air pump voltage>required motor voltage).

In a case where the motor, serving as the load of the fuel cell, is in a low-load state, decision is made with priority on the air pump driving voltage, so the system efficiency can be improved when in a low-load state.

The control method may further include: an external electric power supply determination step of determining whether or not external electric power supply, where electric power supply is performed from the fuel cell system externally, is to be performed; and a required air pump voltage calculating step of calculating a required air pump voltage necessary to enable the fuel cell to generate electric power in accordance with external electric power supply electric power, that is performed in a case where determination is made in the external electric power supply determination step that electric power supply is to be performed. The fuel cell system may further include another voltage transducer that is switched between a boosting state and a directly-connected state between the fuel cell voltage and the secondary side voltage. In the voltage transducer voltage setting step, one of the electric storage device voltage, the fuel cell voltage, and the required air pump voltage, that is the highest voltage, may be set to the secondary side voltage.

Thus, setting the required air pump voltage to the secondary side voltage of the voltage transducer during external electric power supply where there is no need to drive the motor enables more efficient external electric power supply to be performed by generated electric power from the fuel cell.

The control method may further include a voltage transducer control step, in which the boosting state and directly connected state of the voltage transducer and the other voltage transducer are controlled, so that the electric power balance of the electric storage device is zero. This enables more efficient external electric power supply to be continuously performed by generated electric power from the fuel cell.

Each of the above-described configurations can be suitably carried out in a fuel cell automobile.

Obviously, numerous modifications and variations of the present invention are possible in light of the above teachings. It is therefore to be understood that within the scope of the appended claims, the invention may be practiced otherwise than as specifically described herein.

What is claimed is:

1. A control method of a fuel cell system, comprising:
   generating electricity in a fuel cell through reaction of an oxidant gas and a fuel gas so as to output a fuel cell voltage;
   outputting an electric storage device voltage from an electric storage device;
   converting from the electric storage device voltage to a motor driving voltage or from the motor driving voltage to the electric storage device voltage, the electric storage device voltage serving as a primary side voltage, the motor driving voltage serving as a secondary side voltage and being to be applied to a motor driving device to drive a motor;
   applying the secondary side voltage to an air pump driving device to drive an air pump so as to supply the oxidant gas to the fuel cell;
   setting, by a controller, a required air pump voltage to apply to the air pump driving device in accordance with a target generated electric power of the fuel cell; and
   setting, by the controller, the secondary side voltage so as to satisfy the required air pump voltage.

2. The control method according to claim 1, further comprising:
   setting a required motor voltage in accordance with driving request of the motor; and
   comparing the required motor voltage with the required air pump voltage,
   wherein, in the setting of the secondary side voltage,
      in a case where the required motor voltage is higher than the required air pump voltage, the required motor voltage is set to the secondary side voltage, and
      in a case where the required motor voltage is equal to or lower than the required air pump voltage, a highest voltage of the fuel cell voltage, the electric storage device voltage, and the required air pump voltage, is set to the secondary side voltage, within a range of satisfying the required air pump voltage.

3. The control method according to claim 1, further comprising:
   switching a first voltage transducer between a boosting state and a directly-connected state, between the fuel cell voltage and the secondary side voltage;
   determining whether or not external electric power supply to externally supply external electric power supply electric power from the fuel cell system is to be performed; and
   calculating a required air pump voltage which allows the fuel cell to generate electric power in accordance with the external electric power supply electric power, in a case where determination is made in the determining that the external electric power supply is to be performed,
   wherein, in the setting of the secondary side voltage, a highest voltage of the electric storage device voltage, the fuel cell voltage, and the required air pump voltage, is set to the secondary side voltage.

4. The control method according to claim 3, further comprising:
   controlling the boosting state and the directly-connected state of the first voltage transducer and controlling a boosting state, a reducing state, and a directly-connected state of a second voltage transducer so that an electric power balance of the electric storage device is zero, the second voltage transducer being to convert from the electric storage device voltage to the motor driving voltage or from the motor driving voltage to the electric storage device voltage.

5. A fuel cell system comprising:
   a fuel cell to generate electricity through reaction of an oxidant gas and a fuel gas so as to output a fuel cell voltage;
   an electric storage device to output an electric storage device voltage;
   a motor to be driven through a motor driving device;
   a voltage transducer to convert from the electric storage device voltage to a motor driving voltage or from the motor driving voltage to the electric storage device voltage, the electric storage device voltage serving as a primary side voltage, the motor driving voltage serving as a secondary side voltage and being to be applied to the motor driving device;
   an air pump to be driven through an air pump driving device so as to supply the oxidant gas to the fuel cell, the secondary side voltage being to be applied to the air pump driving device; and
   a controller configured to set a required air pump voltage to apply to the air pump driving device in accordance with a target generated electric power of the fuel cell and configured to set the secondary side voltage so as to satisfy the required air pump voltage.

6. A fuel cell automobile comprising the fuel cell system according to claim 5.

7. The fuel cell system according to claim 5, wherein the controller is configured to:
set a required motor voltage in accordance with a driving request of the motor; and
compare the required motor voltage with the required air pump voltage,
wherein, in the setting of the secondary side voltage,
in a case where the required motor voltage is higher than the required air pump voltage, the required motor voltage is set to the secondary side voltage, and
in a case where the required motor voltage is equal to or lower than the required air pump voltage, a highest voltage of the fuel cell voltage, the electric storage device voltage, and the required air pump voltage, is set to the secondary side voltage, within a range of satisfying the required air pump voltage.

8. The fuel cell system according to claim 5,
wherein the voltage transducer forms a second voltage transducer,
wherein the controller is configured to:
switch a first voltage transducer between a boosting state and a directly-connected state, between the fuel cell voltage and the secondary side voltage;
determine whether or not external electric power supply to externally supply external electric power supply electric power from the fuel cell system is to be performed; and
calculate a required air pump voltage which allows the fuel cell to generate electric power in accordance with the external electric power supply electric power, in a case where the external electric power supply is to be performed, and
wherein, in the setting of the secondary side voltage, a highest voltage of the electric storage device voltage, the fuel cell voltage, and the required air pump voltage, is set to the secondary side voltage.

9. The fuel cell system according to claim 8,
wherein the controller is configured to control the boosting state and the directly-connected state of the first voltage transducer and control a boosting state, a reducing state, and a directly-connected state of the second voltage transducer so that an electric power balance of the electric storage device is zero.

10. A fuel cell system comprising:
a fuel cell to generate electricity through reaction of an oxidant gas and a fuel gas so as to output a fuel cell voltage;
electric storage means, including a battery, for outputting an electric storage means voltage;
a motor to be driven through a motor driving device;
voltage transduction means, including a transducer, for converting from the electric storage means voltage to a motor driving voltage or from the motor driving voltage to the electric storage means voltage, the electric storage means voltage serving as a primary side voltage, the motor driving voltage serving as a secondary side voltage and being to be applied to the motor driving device;
an air pump to be driven through an air pump driving device so as to supply the oxidant gas to the fuel cell, the secondary side voltage being to be applied to the air pump driving device; and
control means, including an ECU, for setting a required air pump voltage to apply to the air pump driving device in accordance with a target generated electric power of the fuel cell and for setting the secondary side voltage so as to satisfy the required air pump voltage.

11. The fuel cell system according to claim 10, wherein the control means is configured to:
set a required motor voltage in accordance with a driving request of the motor; and
compare the required motor voltage with the required air pump voltage,
wherein, in the setting of the secondary side voltage,
in a case where the required motor voltage is higher than the required air pump voltage, the required motor voltage is set to the secondary side voltage, and
in a case where the required motor voltage is equal to or lower than the required air pump voltage, a highest voltage of the fuel cell voltage, the electric storage device voltage, and the required air pump voltage, is set to the secondary side voltage, within a range of satisfying the required air pump voltage.

12. The fuel cell system according to claim 10,
wherein the voltage transduction means forms a second voltage transduction means,
wherein the control means is configured to:
switch a first voltage transduction means between a boosting state and a directly-connected state, between the fuel cell voltage and the secondary side voltage;
determine whether or not external electric power supply to externally supply external electric power supply electric power from the fuel cell system is to be performed; and
calculate a required air pump voltage which allows the fuel cell to generate electric power in accordance with the external electric power supply electric power, in a case where the external electric power supply is to be performed, and
wherein, in the setting of the secondary side voltage, a highest voltage of the electric storage means voltage, the fuel cell voltage, and the required air pump voltage, is set to the secondary side voltage.

13. The fuel cell system according to claim 12,
wherein the control means is configured to control the boosting state and the directly-connected state of the first voltage transduction means and controlling a boosting state, a reducing state, and a directly-connected state of the second voltage transduction means so that an electric power balance of the electric storage means is zero.

* * * * *